US006632276B1

(12) United States Patent
Vogt

(10) Patent No.: US 6,632,276 B1
(45) Date of Patent: *Oct. 14, 2003

(54) CONDUCTIVE PIGMENTS

(75) Inventor: Reiner Vogt, Darmstadt (DE)

(73) Assignee: Merck Patent Gesellschaft mit beschrankter Haftung, Darmstadt (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,349

(22) Filed: Nov. 28, 1997

Related U.S. Application Data

(63) Continuation of application No. 08/536,120, filed on Sep. 29, 1995, now abandoned.

(30) Foreign Application Priority Data

Oct. 1, 1994 (DE) .......................................... 44 35 301

(51) Int. Cl.⁷ ............................. H01B 1/00; C04B 14/00
(52) U.S. Cl. ........................ 106/417; 106/415; 106/403; 106/404; 252/520.1
(58) Field of Search ..................... 252/520.1; 106/403, 106/404, 415, 417

(56) References Cited

U.S. PATENT DOCUMENTS

| 3,438,796 | A | | 4/1969 | Hanke | 106/291 |
|---|---|---|---|---|---|
| 4,431,764 | A | | 2/1984 | Yoshizumi | 524/409 |
| 4,435,220 | A | | 3/1984 | Watanabe et al. | 106/291 |
| 4,494,993 | A | | 1/1985 | Bernhard et al. | 106/291 |
| 4,552,593 | A | | 11/1985 | Ostertag | 106/291 |
| 4,772,331 | A | | 9/1988 | Noguchi et al. | 106/417 |
| 4,867,793 | A | | 9/1989 | Franz et al. | 106/415 |
| 4,917,952 | A | * | 4/1990 | Katamoto et al. | 252/519 |
| 4,978,394 | A | | 12/1990 | Ostertag et al. | 106/404 |
| 5,022,923 | A | | 6/1991 | Rau et al. | 106/415 |
| 5,068,063 | A | | 11/1991 | Tremper, III | 252/518 |
| 5,104,583 | A | | 4/1992 | Richardson | 252/518 |
| 5,160,371 | A | | 11/1992 | Ito | 106/19 R |
| 5,236,737 | A | * | 8/1993 | Linton | 252/518 |
| 5,320,781 | A | * | 6/1994 | Stahlecker et al. | 106/417 |
| 5,350,448 | A | | 9/1994 | Dietz et al. | 106/441 |
| 5,472,640 | A | * | 12/1995 | Bruckner et al. | 252/519 |

FOREIGN PATENT DOCUMENTS

| EP | 582371 | * | 9/1994 |
| JP | 60-223167 | | 11/1985 |
| JP | 62-50344 | | 3/1987 |

OTHER PUBLICATIONS

Tadashi Endo et al., "The preparation and electrical properties of $TiO_{2-x}F_x$", J. Mater. Res. 3 (2)., Mar./Apr. 1988.

* cited by examiner

*Primary Examiner*—C. Melissa Koslow
(74) *Attorney, Agent, or Firm*—Millen, White, Zelano & Branigan, P.C.

(57) ABSTRACT

The invention relates to electrically conductive pigments which have, as conductive layer on a substrate, a tin oxide layer doped with phosphorus.

17 Claims, No Drawings

CONDUCTIVE PIGMENTS

This application is a continuation, of application Ser. No. 08/536,120, filed Sep. 29, 1995, now abandoned.

BACKGROUND OF THE INVENTION

The invention relates to electrically conductive pigments which have, as a conductive layer on a substrate, a tin oxide layer doped with phosphorus.

In many areas of industry there is a need for conductive pigments with which, for example, electrically conductive plastics, paints, coatings, fibers or the like which provide shielding from antistatic or electromagnetic waves can be prepared. Conductive carbon black is employed in large amounts for this purpose, but because of its high absorption of light, it cannot be employed for pale or colored coatings.

Another disadvantage is the high absorption of carbon black in the IR range, which, for example, leads to an often undesirable warming of the coated objects under solar irradiation.

EP 373,575 discloses conductive platelet-shaped pigments which have, as a conductive layer, a tin oxide doped with antimony, a thin layer of silicon dioxide being located between the conductive layer and the substrate. The application of an additional layer to the substrate means a considerable increased outlay during preparation and leads to the pigment becoming more expensive.

DE 42 13 747 A1 (corresponding to U.S. Pat. No. 5,350, 448) describes conductive pigments which have, as the conductive layer on a substrate, a tin and/or titanium oxide layer doped with halogen.

However, the conductive pigments from the prior art are not sufficiently opaque and are therefore not suitable for the production of decorative coatings.

Furthermore, the pigments have conductivity values which do not meet the high requirements in this area.

There was therefore a need for stable electrically conductive pigments which are opaquely pale or even colored and, in addition to conductivity, impart to the coatings or plastics a decorative appearance.

SUMMARY OF THE INVENTION

Surprisingly, it has now been found that coating substrates with a tin oxide layer doped with phosphorus leads to decorative conductive pigments which have none of the above-mentioned disadvantages.

The fact that tin oxide powder doped with phosphorus is electrically conductive, is already known from EP-A1 582, 371. However, coating of substrates with a tin oxide layer doped with phosphorus is not described in the prior art.

The invention thus relates to conductive pigments which are distinguished by the fact that a substrate is coated with a conductive layer, the conductive layer being a tin oxide layer doped with phosphorus.

The invention furthermore relates to a process for the preparation of the conductive pigments according to the invention, which is characterized in that an aqueous substrate suspension is prepared and a hydrolyzable tin salt solution and an aqueous phosphorus compound are added, the pH of the substrate suspension being kept in a range which effects hydrolysis of the tin salt by simultaneous addition of a base or an acid, and the substrate coated in this manner is separated off, washed, dried and calcined at temperatures of 400–1100° C. with exclusion of oxygen.

Substrates which can be employed are either platelet-shaped or spherical particles. All known platelet-shaped carrier materials, such as, for example, metals, metal oxides, mica pigments and synthetic platelets, can be coated by the process according to the invention. Examples of these are naturally occurring or synthetic mica, other laminar silicates, such as talc, kaolin or sericite, or other comparable materials, platelet-shaped iron oxide, aluminum platelets, bismuth oxychloride, $SiO_2$ flakes, glass flakes or synthetic ceramic flakes.

Since no high gravity forces are required in the process, the process is also outstandingly suitable for coating pearl luster pigments, for example mica coatings with colored or colorless metal oxides, such as $TiO_2$, $Fe_2O_3$, $SnO_2$, $Cr_2O_3$, ZnO and other metal oxides, by themselves or as a mixture in a uniform layer or in successive layers. These pigments are known, for example, from German Patents and Patent Applications 14 67 468, 19 59 998, 20 09 566, 2 14 545, 22 15 191, 2 44 298, 23 13 331, 25 22 572, 32 11 602 and 32 35 017 and are commercially obtainable, for example under the trade name Iriodin® from E. Merck, Darmstadt.

The spherical particles can consist be for example, $SiO_2$ or metal oxides, such as, for example, $Fe_2O_3$, $TiO_2$, $MgTiO_3$, $CaTiO_3$, $BaTiO_3$, $SrTiO_3$, $Al_2O_3$ or $BaSO_4$, $CaSO_4$, or $CaCO_3$. Preferred spherical particles are $Al_2O_3$, $BaSO_4$ or $SiO_2$.

The particles have an average diameter of less than 200 $\mu$m, and in particular not more than 50 $\mu$m. Platelet-shaped substrates extend less than 500 $\mu$m in the main dimension, in particular less than 250 $\mu$m, and their thickness is less than 10 $\mu$m, preferably not more than 5 $\mu$m, and in particular in the range from 0.1 to 1 $\mu$m. The ratio of the extension in the main dimension to the thickness (aspect ratio) of the platelet-shaped substrates is more than 3, and in particular more than 5.

The substrates to be coated can also be a mixture of platelet-shaped and spherical particles, the platelet-shaped:spherical ratio preferably being in the range from 80:20 to 20:80, and in particular 50:50.

According to the invention, the substrates are suspended in water, and the solution of a water-soluble tin salt and a water-soluble phosphorus compound is added, preferably at elevated temperature and at a suitable pH, the pH being kept in the suitable range, if appropriate, by simultaneous addition of an acid or base.

The industrially readily accessible bases, such as, for example, NaOH, KOH or ammonia, and, as acids, dilute mineral acids are expediently used. Since the bases and acids serve only to change the pH, their nature is not critical, so that other acids and bases can also be employed.

Suitable tin salts are preferably the 2- and 4-valent halides, sulfates or nitrates, preferably the halides, and in particular the chlorides. A tin salt solution comprising $SnCl_4$ and $SnCl_2$, the ratio of $Sn^{IV}$ to $Sn^{II}$ being in the range from 90:10 to 10:90, in particular 80:20 to 60:40, is particularly preferred, and solutions which comprise only tin(IV) salts are furthermore preferred. The tin salts can also be added in solid form to the aqueous substrate suspension.

Suitable phosphorus compounds are the phosphorus trihalides, phosphoryl halides and the oxygen acids of phosphorus, as well as sodium phosphates. The readily accessible and inexpensive phosphoric acid or sodium phosphate is preferably employed.

A conductive layer of tin oxide doped with phosphorus, the layer being applied in an amount of about 25–100% by weight, based on the substrate, in particular in an amount of 50–75% by weight, is preferred. Although larger amounts are also possible per se, no further increase in conductivity is thereby achieved, and the pigments become increasingly darker. The content of tin oxide is typically 20–70% by weight based on the total pigment. The content of phosphorus in the conductive layer, based on the tin, is 0.1–20 atom %, preferably 1–10 atom %, and in particular 2–8 atom %. If the phosphorus content is too low, high conductivities cannot be achieved, while if the phosphorus content is too high, the pigments become increasingly paler and the conductivity decreases drastically.

The desired homogeneous distribution of tin and phosphorus in the conductive layer can be achieved without problems by metering the tin compounds and phosphorus compounds in water, either together in one solution or in two separate solutions, continuously and in the predetermined mixing ratio into the substrate suspension at a suitable pH of about 1 to 5 and a suitable temperature of about 50 to 90° C. such that in each case hydrolysis and deposition on the substrate take place immediately.

Any acid or base can be employed to precipitate the metal salts. The optimum concentrations and pH values can be determined by routine experiments. The pH once established for the precipitation is usually retained throughout the entire precipitation in order to achieve uniform pigments.

When the coating operation has ended, the pigments are separated off from the suspension, washed, dried and calcined at temperatures of 400–1100° C., preferably 900–1000° C., for 15 minutes to 5 hours with exclusion of oxygen. The pigments according to the invention are yellowish, silver-colored, pale grey or slightly grey-brown, depending on the choice of starting material and the layer thickness of the doped tin oxide layer.

In addition to phosphorus and tin oxide, the conductive layer can also additionally comprise other metal oxides. Thus, for example, it may be advantageous to add to this outer layer other metal oxides, such as, for example, aluminum oxide, iron oxide, zirconium oxide or chromium oxide, to increase the thermal and/or mechanical stability or to produce special color effects. Since the specific resistance of the pigments is in general increased by these additions, their amount by weight in the outer layer is preferably not too high, e.g., less than 25% by weight. Pigments in which such additions make up less than 10% by weight, and in particular less than 5% by weight, are particularly preferred. Also contemplated are pigments which are essentially free of, or contain 0% by weight of, other oxides in the conductive layer. Typically the conductive layer is the top layer of the pigment.

A high conductivity is imparted to the pigments according to the invention by the tin oxide layer doped with phosphorus, and the specific resistance is in general between $1 \cdot 10^1$ and $1 \cdot 10^4$ Ωcm, preferably 10–1000 Ω.cm, more preferably 10–300 Ω.cm, depending on the composition of the outer layer.

In addition to the high electrical conductivity, the pigments according to the invention are distinguished by a covering power which can be optimized with respect to the particular use and desired depth of color. Depending on their specific embodiment, the pigments according to the invention can be used for a whole range of different uses, such as, for example, for transparent electrodes for driving—for example—liquid crystal displays, for antistatic coatings or for antistatic plastics, floor coverings and the like. They are furthermore used in paints, varnishes, printing inks and plastics.

The invention therefore likewise relates to formulations which comprise the pigments according to the invention. The pigments according to the invention often meet the requirements which arise for particular uses better than conventional pigments, and in all cases represent a considerable extension to the pool of such compounds available to the expert. The compounds according to the invention are thus of considerable economic importance.

The possible uses listed for the pigments according to the invention are to be understood only as examples and are intended merely to illustrate the invention without limiting it. However, whatever the specific requirement profile for a certain use, the expert can vary the properties of the pigments within a wide range and optimize them in respect of the particular use.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German application No. P 44 35 301.4, filed Oct. 1, 1994 is hereby incorporated by reference.

EXAMPLES

Example 1

50 g of $SiO_2$ flakes having a particle diameter of 1–40 μm are suspended in 2 l of water. 200 ml of an aqueous solution comprising 70 g of $SnCl_4 \cdot 5H_2O$, 12 g of $SnCl_2 \cdot 2H_2O$, 10 ml of concentrated HCl and 0.1 g of 85% $H_3PO_4$ are metered into the suspension at 75° C. at a pH of 2.0. The pH is kept constant during the hydrolysis by addition of sodium hydroxide solution. When the coating has ended, the product is filtered off with suction, washed with water, dried and calcined at 1000° C. for 30 minutes under nitrogen. After the calcining, a pale, slightly grey-brown pigment which has a specific powder resistance of 180.Ωcm is obtained.

To determine the specific resistance, about 1.5 g of pigment are compressed in an acrylic glass tube of diameter d with the aid of two metal dies and the electrical resistance R which occurs is measured. The specific powder resistance is obtained from the layer thickness L of the compressed pigment (corresponding to the distance between the metal dies) according to $$\rho = R \cdot \frac{\pi \cdot (d/2)^2}{L} [\Omega \cdot cm].$$

Example 2

50 g of $SiO_2$ flakes having a particle diameter of 1–40 μm are suspended in 2 l of water, and 200 ml of an aqueous solution comprising 87 g of $SnCl_4 \cdot 5H_2O$, 10 ml of concentrated HCl and 1.3 g of 85% $H_3PO$, are metered into the suspension at 75° C. and at a pH of 2.2. The pH is thereby kept constant by addition of sodium hydroxide solution. When the coating has ended, the product is filtered off with suction, washed with water, dried and calcined at 1000° C. for 30 minutes under nitrogen. A pale, slightly grey-brown pigment having a specific powder resistance of 190 Ω.cm is obtained.

Example 3

50 g of spherical barium sulphate particles (Barytmethyl F from Sachtleben) are suspended in 2 l of water. 200 ml of an aqueous solution comprising 70 g of SnCl$_4$.5H$_2$O, 12 g of SnCl$_2$.2H$_2$O, 10 ml of concentrated HCl and 1.5 g of 85% strength H$_3$PO$_4$ are then metered in at 75° C. and at a pH of 2.0. The pH is kept constant by simultaneous addition of sodium hydroxide solution. When the coating has ended, the product is filtered off with suction, washed, dried and calcined at 700° C. for 30 minutes under an inert gas. A pale, slightly grey-brown pigment which has a specific powder resistance of 2000 Ω.cm is obtained.

Example 4

A substrate mixture comprising 25 g of SiO$_2$ flakes (particle diameter 1–40 μm) and 25 g of spherical barium sulphate particles (Barytmethyl F from Sachtleben) is coated with a phosphorus-doped tin oxide layer analogously to Example 3. The resulting product has a specific powder resistance of 500 Ω.cm.

Example 5

50 g of spherical SiO$_2$ (Dorsilikit Mikromehl 405 from Dorfner) are coated with a phosphorus-doped tin oxide layer analogously to Example 3. After calcining at 1000° C. for 0.5 hour, the resulting product has a specific powder resistance of 380 Ω.cm.

Example 6

25 g of SiO$_2$ flakes (particle diameter 1–40 pm) and 25 g of spherical SiO$_2$ (Dorsilikit Mikromehl 405 from Dorfner) are coated with a phosphorus-doped tin oxide layer analogously to Example 5. After calcining at 1000° C. for 0.5 hour, the resulting product has a specific powder resistance of 220 Ω.cm.

Comparison Example 1

50 g of SiO$_2$ flakes having a particle diameter of 1–40 pm are suspended in 2 l of water. 200 ml of an aqueous solution comprising 70 g of SnCl$_4$.5H$_2$O, 12 g of SnCl$_2$.2H$_2$O and 10 ml of concentrated HCl are metered in at a pH of 2.0 at 75° C. The pH is kept constant by simultaneous addition of sodium hydroxide solution. When the coating has ended, the product is filtered off with suction, washed, dried and calcined at a 1000° C. for 30 minutes under an inert gas. An almost white product which has no conductivity at all (>50 10$^6$ Ω.cm) is obtained.

Example 7

50 g of SiO$_2$ flakes having a particle diameter of 1–40 μm are suspended in 2 l of water. 200 ml of an aqueous solution comprising 70 g of SnCl$_4$.5H$_2$O, 12 g of SnCl$_2$.2H$_2$O, 10 ml of concentrated HCl and 4.5 g of 85% H$_3$PO$_4$ are metered into the suspension at a pH of 2.0 at 75° C. During the hydrolysis, the pH is kept constant by addition of sodium hydroxide solution. When the coating has ended, the product is filtered off with suction, washed with water, dried and calcined at a 1000° C. for 30 minutes under nitrogen. After calcining, a pale, slightly grey-brown pigment which has a specific powder resistance of 140·10$^3$ Ω.cm is obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A conductive pigment, comprising a substrate coated with a conductive layer containing tin oxide doped with phosphorus, and aluminum oxide, iron oxide, zirconium oxide or chromium oxide.

2. A pigment according to claim 1, wherein the content of phosphorus in the tin oxide layer is 0.1–20 atomic %.

3. A pigment according to claim 1, wherein the content of tin oxide, based on the total pigment, is 20–70% by weight.

4. A pigment according to claim 2, wherein the content of tin oxide, based on the total pigment, is 20–70% by weight.

5. A pigment according to claim 1, wherein the substrate is a platelet-shaped substrate.

6. A pigment according to claim 5, wherein the platelet-shaped substrate is mica, SiO$_2$ flakes, glass flakes, synthetic ceramic flakes or a pearl luster pigment.

7. A pigment according to claim 5, wherein the platelet-shaped substrate is a pearl luster pigment.

8. A pigment according to claim 1, wherein the substrate is spherical Al$_2$O$_3$, BaSO$_4$, Fe$_2$O$_3$, TiO$_2$, MgTiO$_3$, CaTiO$_3$, BaTiO$_3$, SrTiO$_3$, CaSO$_4$, CaCO$_3$, or SiO$_2$ particles.

9. A pigment according to claim 1, wherein the substrates is a mixture of platelet-shaped and spherical particles.

10. A pigment according to claim 1, wherein the amount of the conductive layer is 25–100% by weight of the substrate.

11. A pigment according to claim 2, wherein the amount of the conductive layer is 25–100% by weight of the substrate.

12. A pigment according to claim 1, having a conductivity of 1×10$^1$ to 1×10$^4$ Ω.cm.

13. In a varnish, paint, printing ink or plastic containing a pigment, the improvement wherein the pigment is one according to claim 1.

14. A process for the preparation of a pigment according to claim 1, wherein an aqueous substrate suspension is prepared and a hydrolyzable tin salt solution, a salt solution of aluminum, iron, zirconium or chromium, and an aqueous phosphorus compound are simultaneously added, the pH of the substrate suspension being kept in a range which effects hydrolysis of salt solutions by simultaneous addition of a base or an acid, and the substrate coated in this manner is separated off, washed, dried and calcined at temperatures of 400–1100° C. with exclusion of oxygen.

15. A pigment according to claim 1, wherein the substrate particles are spheres having an average diameter of less than 200 μm.

16. A pigment according to claim 1, wherein the substrate particles are spheres having an average diameter of not more than 50 μm.

17. A pigment according to claim 5, wherein the platelet has a size of less than 500 μm in a main dimension.

* * * * *